United States Patent
Gargaro et al.

(10) Patent No.: US 10,225,261 B2
(45) Date of Patent: Mar. 5, 2019

(54) ADAPTIVE ENHANCED ENVIRONMENT-AWARE AUTHENTICATION FOR IOT DEVICES

(71) Applicant: International Business Machines Corporation, Armonk, NY (US)

(72) Inventors: Gianluca Gargaro, Rome (IT); Patrizio Trinchini, Introdacqua (IT)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 15/249,875

(22) Filed: Aug. 29, 2016

(65) Prior Publication Data

US 2018/0063108 A1    Mar. 1, 2018

(51) Int. Cl.
| | |
|---|---|
| *H04L 29/06* | (2006.01) |
| *H04W 4/02* | (2018.01) |
| *H04W 12/06* | (2009.01) |
| *H04W 12/08* | (2009.01) |
| *H04L 12/933* | (2013.01) |

(52) U.S. Cl.
CPC ........ *H04L 63/104* (2013.01); *H04L 63/0846* (2013.01); *H04L 63/108* (2013.01); *H04W 4/02* (2013.01); *H04W 12/06* (2013.01); *H04W 12/08* (2013.01); *H04L 49/109* (2013.01)

(58) Field of Classification Search
None
See application file for complete search history.

(56) References Cited

U.S. PATENT DOCUMENTS

| | | | |
|---|---|---|---|
| 8,448,257 B2 | 5/2013 | Garcia Garcia et al. | |
| 8,850,191 B2* | 9/2014 | Everhart | G06F 21/33 |
| | | | 713/158 |
| 9,754,097 B2* | 9/2017 | Hessler | G06F 21/44 |
| 9,825,967 B2* | 11/2017 | Davis | G06F 17/30595 |

(Continued)

OTHER PUBLICATIONS

"Cisco Identity Services Engine with Identity Access Management and Single Sign-on Platforms", Cisco, At-a-Glance, http://www.cisco.com/c/dam/en/us/products/collateral/security/identity-services-engine/at-a-glance-c45-732857.pdf, 2015 (month unknown), retrieved from the internet Aug. 17, 2016, 2 pages.

(Continued)

*Primary Examiner* — Benjamin E Lanier
(74) *Attorney, Agent, or Firm* — Francis Lammes; Stephen J. Walder, Jr.; Jeffrey S. LaBaw

(57) ABSTRACT

A mechanism is provided for authentication and authorization of an access to a resource by a device may be provided. The device may be a system-on-a-chip resource weak device. The mechanism forms a federation of a group of the devices in a neighborhood. The devices are wireless communication enabled. The mechanism builds a representational vector for each device of the federation of devices during an initial authentication procedure for the device. The representational vector comprises characteristic parameters of the device and neighboring devices. The mechanism uses an access token based authorization process for accessing the resource. The access token is generated during the initial authentication procedure, in which the representational vector of the device is used to confirm that a device that is new to the federation is in the neighborhood of already federated devices.

18 Claims, 8 Drawing Sheets

(56) References Cited

U.S. PATENT DOCUMENTS

| | | |
|---|---|---|
| 2011/0167479 A1 | 7/2011 | Maes |
| 2014/0157351 A1 | 6/2014 | Canning et al. |
| 2014/0244710 A1 | 8/2014 | Sharma et al. |
| 2015/0006695 A1 | 1/2015 | Gupta |
| 2015/0019710 A1 | 1/2015 | Shaashua et al. |
| 2015/0019717 A1 | 1/2015 | Li et al. |
| 2015/0244699 A1* | 8/2015 | Hessler .................. G06F 21/44 726/7 |
| 2016/0316034 A1* | 10/2016 | Herrick .................. H04L 67/26 |
| 2016/0337346 A1* | 11/2016 | Momchilov ............ G06F 21/34 |
| 2016/0344841 A1* | 11/2016 | Wang ...................... H04W 4/70 |
| 2017/0012974 A1* | 1/2017 | Sierra .................. H04L 9/3247 |
| 2018/0007059 A1* | 1/2018 | Innes .................... H04L 63/104 |

OTHER PUBLICATIONS

Habib, Kashif et al., "Context-Aware Authentication for the Internet of Things", ICAS 2015, The Eleventh International Conference on Autonomic and Autonomous Systems, May 25, 2015, pp. 134-139.
Mahalle, Parikshit N. et al., "Threshold Cryptography-based Group Authentication (TCGA) Scheme for the Internet of Things (IoT)", 4th International Conference on Wireless Communications, Vehicular Technology, Information Theory and Aerospace & Electronic Systems (VITAE), May 11-14, 2014, 5 pages.

* cited by examiner

ADAPTIVE ENHANCED ENVIRONMENT-AWARE AUTHENTICATION FOR IOT DEVICES

BACKGROUND

The present application relates generally to authentication and authorization of an access to a resource by a device, and more specifically, to a mechanisms for authentication and authorization of an access to a resource by a device, which is a computational resource weak device. The present application relates further to a system for authentication and authorization of an access to a resource by a device, and a computer program product.

Nowadays, an emerging number of IoT (Internet-of-Things) devices are installed to control production and logistic processes to help to protect the environment, measure environmental parameters, and so on. Basically, IoT devices are omnipresent. However, an emerging number of these devices are based on a SoC (system-on-chip) technology. They may be used as sensors or actuators. Despite the growing computational power, flexibility and capacity of the SoCs, it continues to be important not to exceed capacity limits by requirements related to demanding software functions and communication protocols. Such overburdening of the SoCs goes against most of the rules of real-time embedded solutions as well as energy-saving rules.

With such increasing number of devices it is necessary to find a way of computational low-cost automatic authentication and authorization operations that can be performed on services located anywhere and that may belong to different owners—and at the same time minimize the amount of data or software needed for these processes, at least from a device perspective.

In this context it is highly important that only well known, identified and trusted devices can post data as well as that only proper and correct actuators received commands. When the number of IoT devices grows and when they change dynamically (in location and/or in nature) a growing problem may exist to manage the identification and the authorization for all of them.

Delegated authorization protocols, such as OAuth, are often used in a similar context. However, the irrelevant task is still reserved to the resource owner that must authorize every device and grant permission on what resource to access. Moreover, the authorization grant has a limited lifetime, the scope of the authorization is fixed, and a full stack of web protocol implementation is required.

There are also other known techniques for giving automatic consent to certain clients by classifying and comparing commonality with other devices. However, those techniques cannot be used for clients that are tiny SoC IoT devices due to a limited fingerprint or identity, simple limited computational resources, different nature and dynamic changes to scoped grants.

Furthermore, there are also techniques for identifying a context-based access by defining proper policy grant access roads by building a risk score. However, those policies are statically defined and do not work properly in the dynamic context resulting in an improper risk calculation.

SUMMARY

In one illustrative embodiment, a method for authentication and authorization of an access to a resource by a device may be provided. The device may be a system-on-a-chip resource-weak device. The illustrative embodiment forms a federation of a group of the devices in a neighborhood. The devices may be wireless communication enabled. The illustrative embodiment builds a representational vector for each device of the federation of devices during an initial authentication procedure for the device. The representational vector may comprise characteristic parameters of the device and neighboring devices. The illustrative embodiment uses an access token based authorization process for accessing the resource. The access token may be generated during an initial authentication procedure, in which the representational vector of the device may be used to confirm that a device that is new to the federation is in the neighborhood of already federated devices.

In another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In yet another illustrative embodiment, a computer program product comprising a computer useable or readable medium having a computer readable program is provided. The computer readable program, when executed on a computing device, causes the computing device to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed, within this document.

The aspects defined above and further aspects of the present invention are apparent from the examples of embodiments to be described hereinafter and are explained with reference to the examples of embodiments, but to which the invention is not limited.

Figure 1:
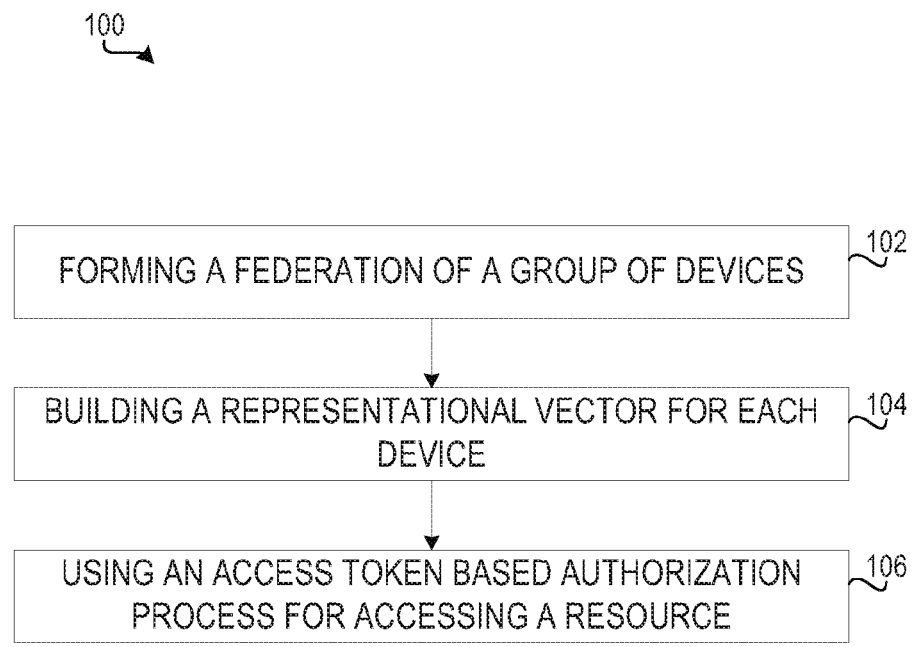
Figure 2:
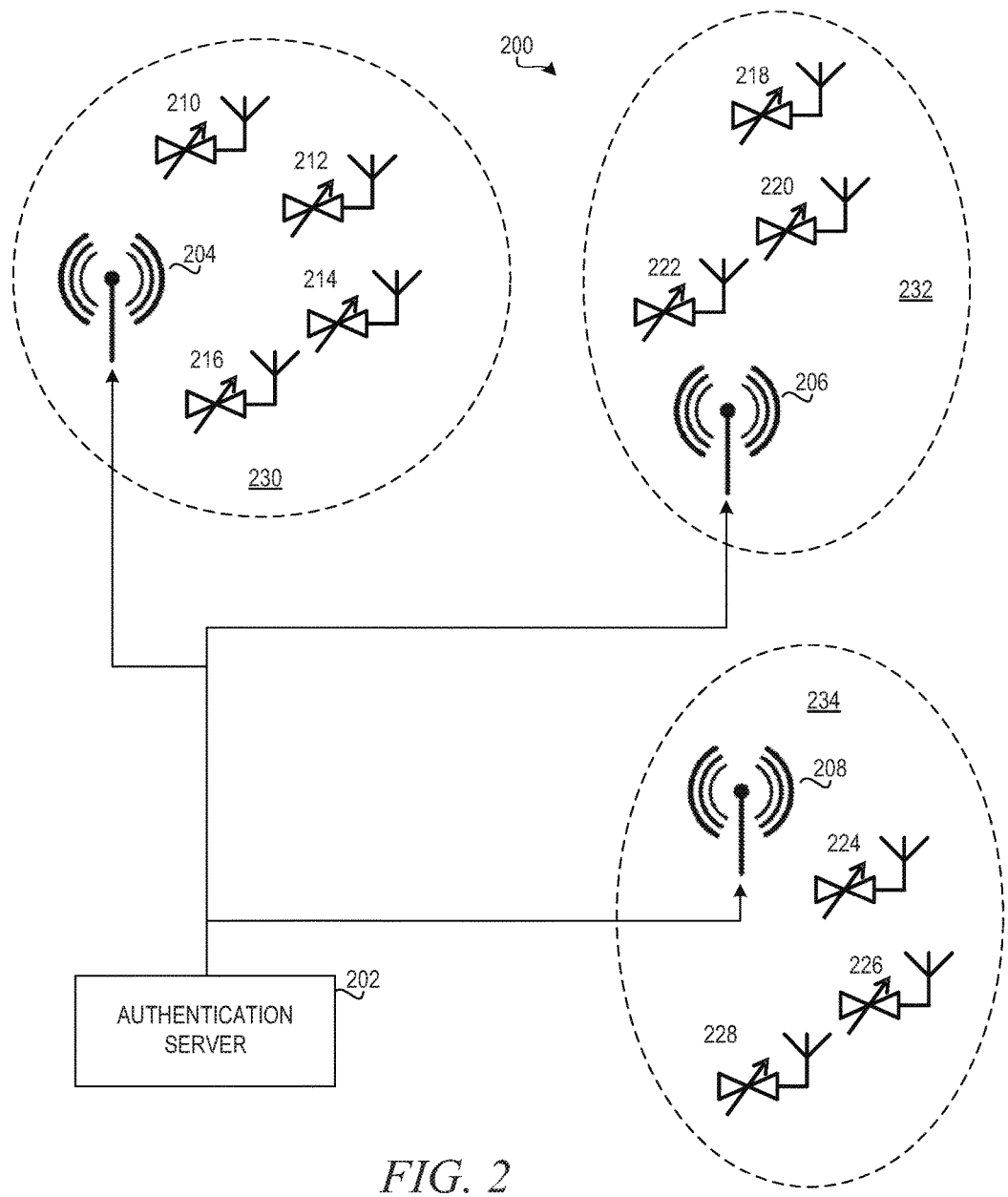
Figure 3:
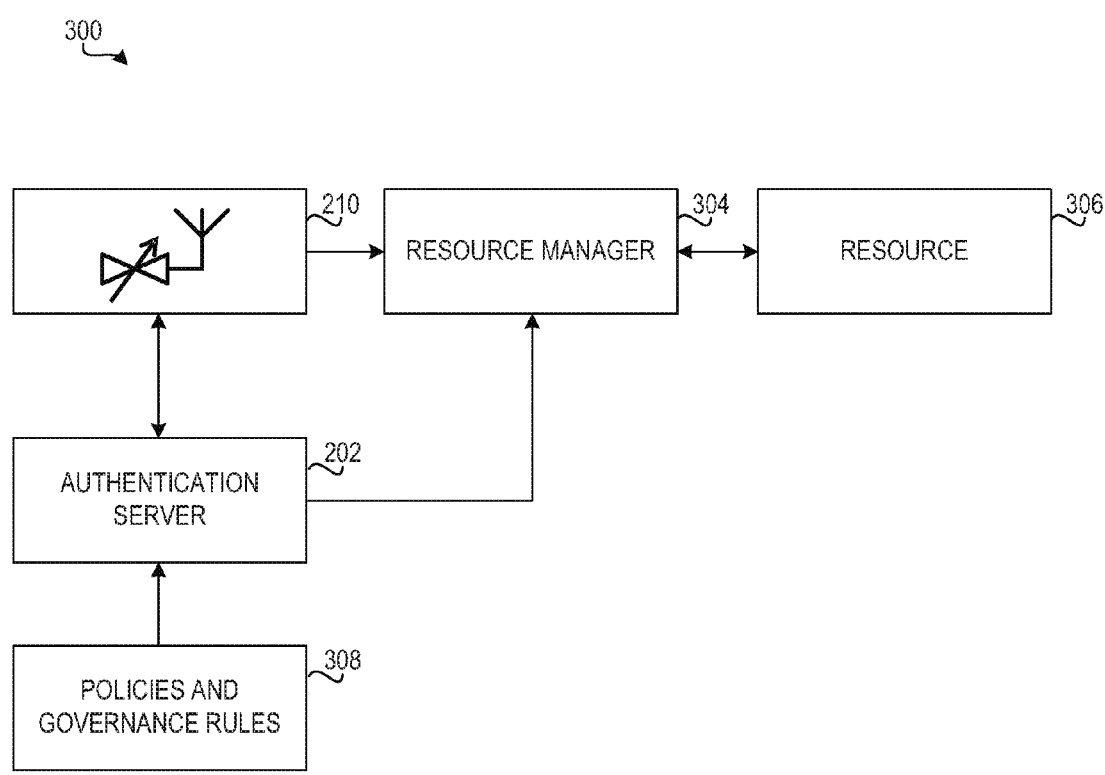
Figure 4:
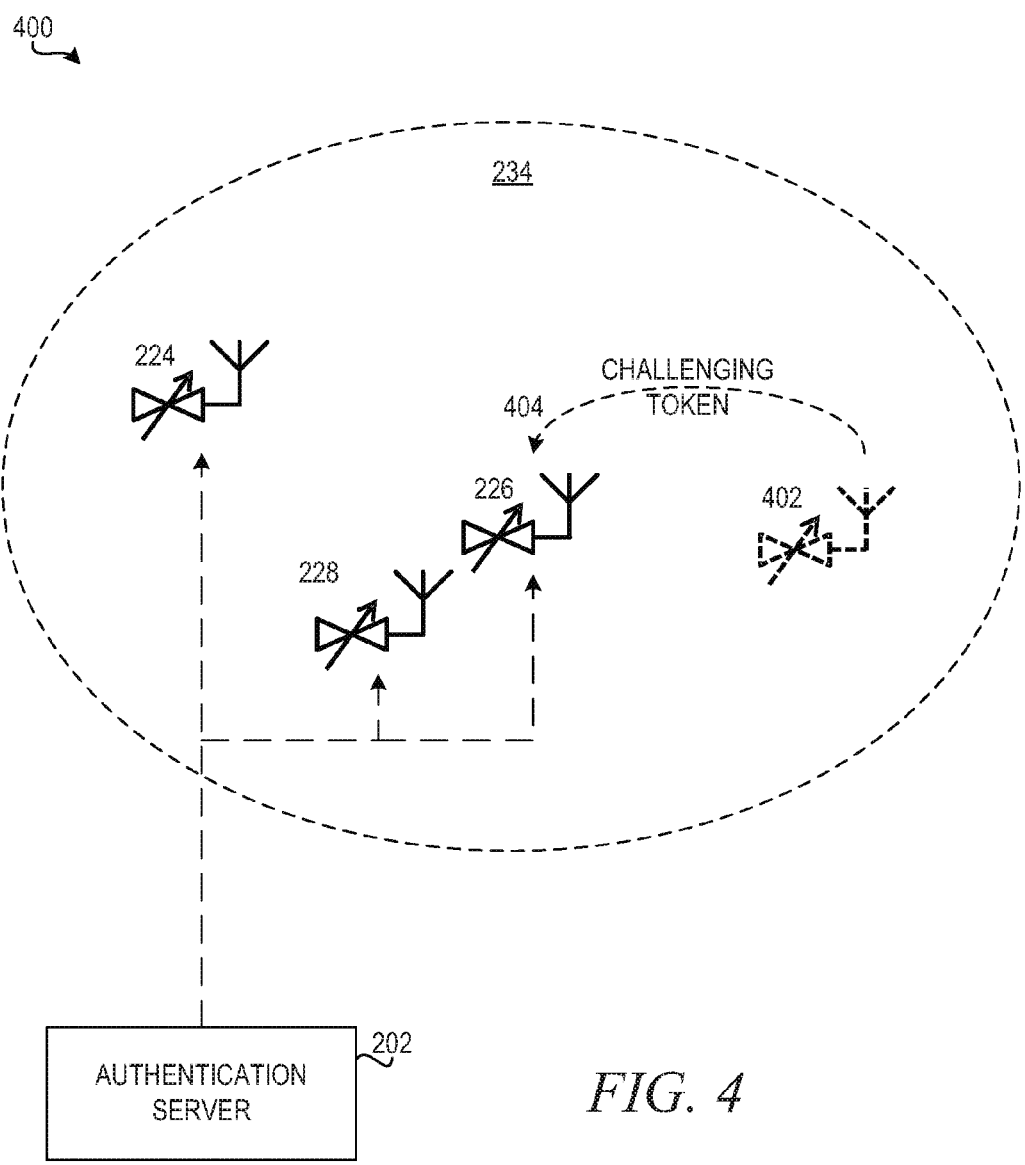
Figure 5:
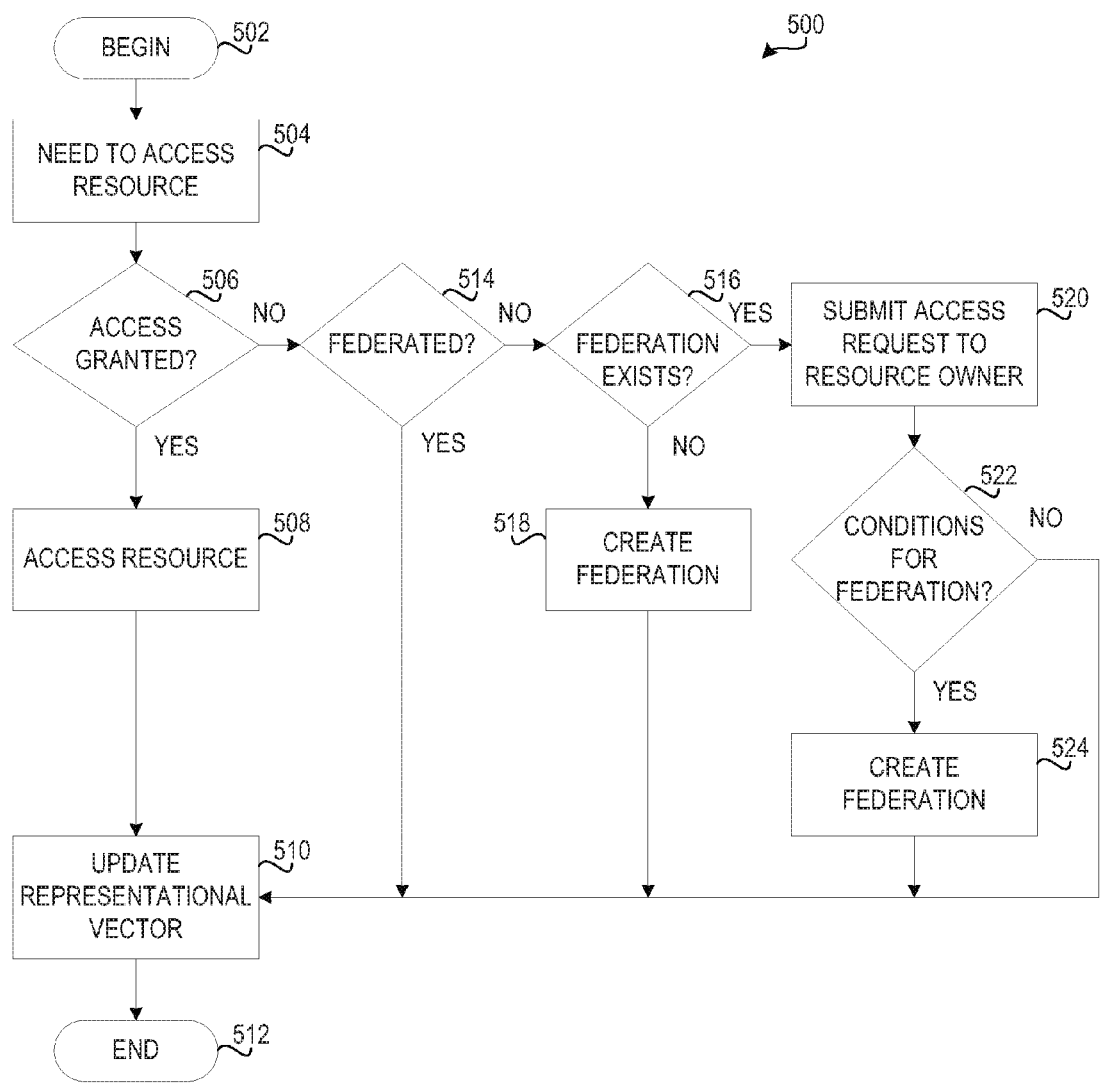
Figure 6:
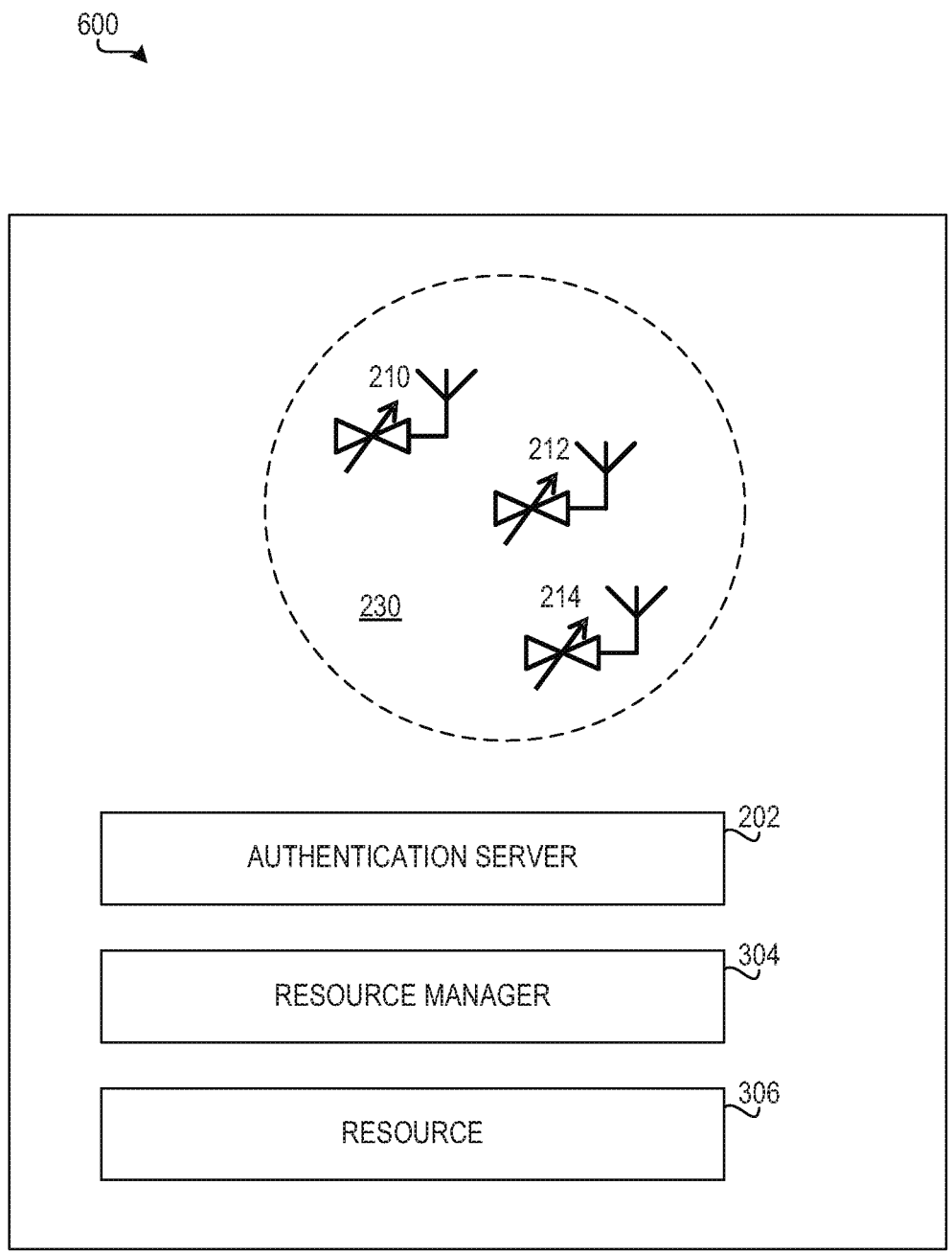
Figure 7:
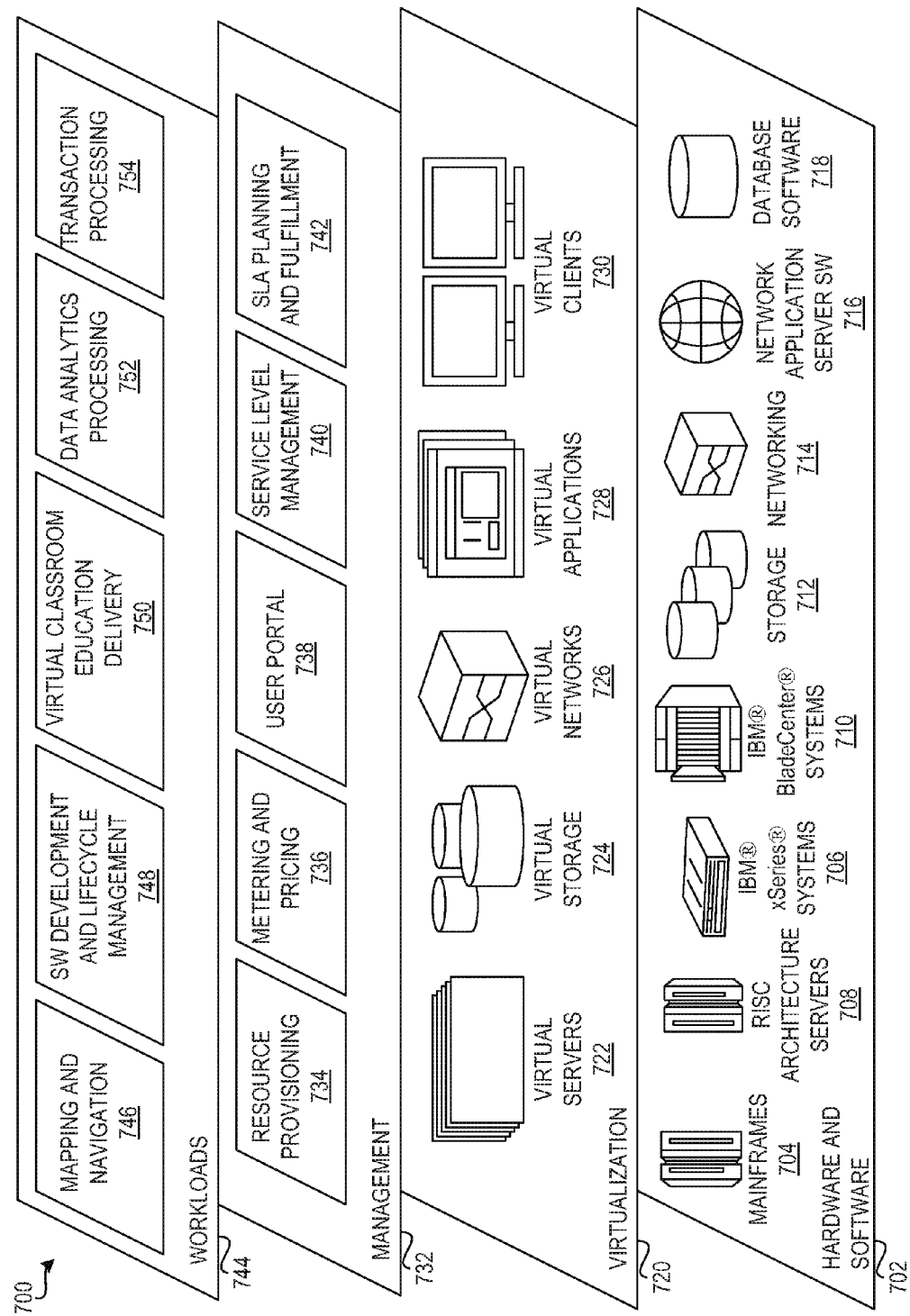

Preferred embodiments of the invention will be described, by way of example only, and with reference to the following drawings:

FIG. 1 shows a block diagram of an embodiment of the inventive method for authentication and authorization of an access to a resource by a device;

FIG. 2 shows a block diagram of multiple devices organized in three federations;

FIG. 3 shows a block diagram of an embodiment of an implementation of the he proposed concept with an authentication server and a resource manager;

FIG. 4 shows a block diagram of an exemplary implementation of adding a new device to the federation of devices;

FIG. 5 shows a flowchart of a process if a device needs to access a resource;

FIG. 6 shows an embodiment of the system for authentication and authorization of an access to a resource by a device;

FIG. 7 shows a cloud computing environment; and

Figure 8:
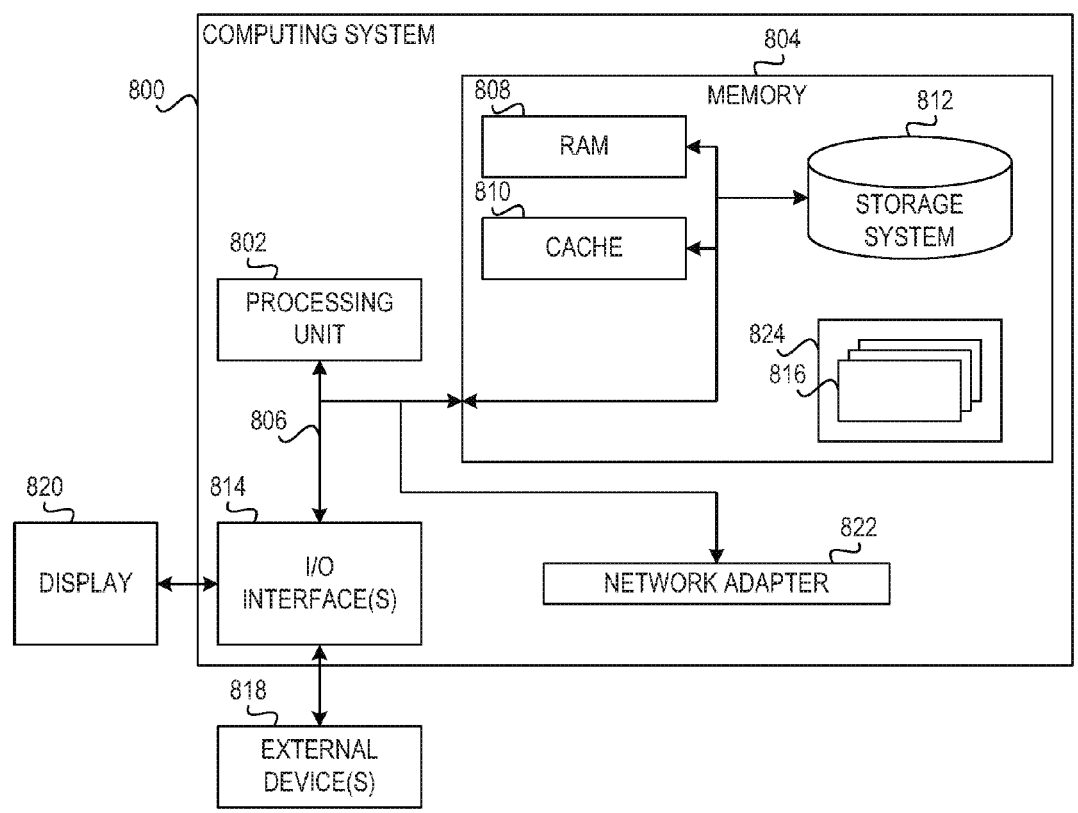

FIG. 8 shows an embodiment of a computing system instrumental for performing the proposed method.

DETAILED DESCRIPTION

In the context of this description, the following conventions, terms and/or expressions may be used:

The term 'authentication' may denote in an abstract way an act of confirming the truth of an attribute of a single piece of data (a datum) claimed true by an entity. Authentication may be the process of actually confirming an identity of, e.g., a device or, in another context, a person. It might involve confirming the identity of the device by validating a device's identity pattern, e.g. a representational vector. In other words, authentication often involves verifying the validity of at least one form of identification.

The term 'authorization' may denote a function of specifying access rights to resources related to information security and computer security in general and to access control in particular. More formally, 'to authorize' is to define an access policy. During operation, a related system may use the access control rules to decide whether access requests from (authenticated) devices shall be approved (granted) or disapproved (rejected). Thus, after an initial authentication, a device may be repetitively granted access to a resource by a repetitive authorization.

The term 'resource' may denote here a service provided by a computer system or any other device. The service may be a computational or processing service, a software service, a storage service, a network service, any combination of the before-mentioned services or any other information technology related or enabled service. A typical service in the given context may be a cloud computing service provided by a cloud computing center. However, also on-premise solutions for the service delivery are possible (e.g., private cloud).

The term 'resource weak' may denote that a device's resources i.e., its computational resources—are limited as it may typically be the case for sensors also actuators in IoT or Industry 4.0 environments. Such sensors need to be cheap and require low-power consumption because they are often installed in difficult to reach positions/locations or environments.

The term 'federation' may denote a group of more or less identical items, like devices that act as IoT SoCs. The federation limits may be defined by a reach of a wireless signal sendable and receivable by any of the devices of the federation of devices. Hence, it should be possible that the devices of a federation communicate with each other by wireless signals. Devices outside the reach of these wireless signals should not be part of the federation. Such devices may build another federation with another group of devices. Typically, a wireless relay station or ground station may belong to a federation of devices to serve as long-range communication device. The long-range communication may be required to connect the federation of devices to other higher-level control instances not belonging to a federation, e.g., the authorization server and/or the resource manager.

The term 'neighborhood' may denote a physical surrounding of a device or group of devices. The neighborhood may be defined by the reach of a wireless signal sendable and receivable by a device of the neighborhood.

The term 'representational vector' may denote a characteristic set of parameters with related values instrumental for identifying a specific device. Each device may have a unique representational vector such that it may be identified as a unique device. This may be true for each device as part of one federation as well as devices belonging to different federations. The representational vector may be used during an authentication procedure.

The term 'characteristic parameter' may denote one of a plurality of the following parameters: a unique device identifier, a federation identifier, a Service Set Identifier of a wireless local area network of a federated device, a Bluetooth name, a Rich Site Summary feed identifier of a federated device, a Media Access Control number of a federated device, a resource locator address of a resource accessed the device, a counter indicating how often a universal resource locator address has been accessed, an access token, a time of last access to a resource, global positioning data, and an epoch for a validity of the access token. However, also other parameters may be used as characteristic parameters. It may not be required that each parameter has a unique value such that a device may be identified by each one of the characteristic parameter values. However, the representational vector comprising values of characteristic parameters may allow a unique identification of a device.

The term 'access token based authorization process' may denote a process of authorizing a device to access a resource, e.g., a service, by use of a digital token. Instead of using a complete two-way high level handshake authorization process, a device may be granted access to a service by using the pre-generated access token. However, an initial setup step may be required for ensuring a proper authentication of the device and an exchange of the access token. The access token may be part of the representational vector, i.e., one element of it.

The term 'resource manager' may denote a gating service or device controlling an access to a resource, e.g., a service. Another service, e.g., from a device, may be granted access by the resource manager based on an access token. It may not be required that the resource manager also performs an authentication process for each and every device.

It may be noted that the device may access the resource which may be a service in a cloud computing environment.

Essential characteristics of cloud computing comprise:

i. On-demand self-service. A consumer can unilaterally provision computing capabilities, such as server time and network storage, as needed automatically without requiring human interaction with each service provider.

ii. Broad network access. Capabilities are available over the network and accessed through standard mechanisms that promote use by heterogeneous thin or thick client platforms (e.g., mobile phones, laptops, and PDAs).

iii. Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

iv. Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

v. Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud Computing used comprise:

i. Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

ii. Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

iii. Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:

i. Private cloud. The cloud infrastructure is operated solely by an organization. It may be managed by the organization or a third party and may exist on premise or off premise.

ii. Community cloud. The cloud infrastructure is shared by several organizations and supports a specific community that has shared concerns (e.g., mission, security requirements, policy, and compliance considerations). It may be managed by the organizations or a third party and may exist on premise or off premise.

iii. Public cloud. The cloud infrastructure is made available to the general public or a large industry group and is owned by an organization selling cloud services.

iv. Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness, low coupling, modularity, and semantic interoperability.

The proposed method for authentication and authorization of an access to a resource by a device may offer multiple advantages and technical effects:

The method and the related system may be easily adapted by a large plurality of lightweight devices, i.e., those IoT devices with little computational resources, like SoCs. After an initial authorization process for a device, only a lightweight authorization process for accessing a resource in form of a service may be required. No complex handshake authorization processes may be required for accessing a service by the device. This has a positive effect of the energy source, a battery, in the device, as well as on network traffic.

Thus, low bandwidth network connections with low energy requirements may be used by the devices. Additionally, the proposed concept is independent of the kind of wireless communication. RF techniques may be used as well as light or IR-based communication methods.

The proposed concept also allows including policies for accessing of services by devices. It may, e.g., be possible to change a token for a device after a security or access policy may have been changed. The exchange of the token may be controlled by the authentication server. Thus, a resource manager may decide to grant access or not to service based on the token. If the access token may only be valid for an older access policy, no access may be granted.

The proposed concept also makes use of the context based authentication and authorization method. One may also say that the authentication and authorization processes are context-aware and/or environment-aware. The authorization of a new device in a federation is based on knowledge/data available within the devices of the federation. The authorization process of a new device may only be completed successfully if the new device communicates successfully with the already existing devices of the federation in a defined neighborhood, which may be limited by the reach of the wireless signals of the devices.

Using the proposed method and system allows an easy and secure management of a large and dynamically changing plurality of IoT devices in difficult to reach environments. Maintenance cost may be reduced by using the method and system.

In the following, additional embodiments of the method and the related system will be described. The embodiments may be implemented in form of the method and/or in form of the related system.

According to one preferred embodiment of the method, the neighborhood may be defined by a reach of a wireless communication mechanism of the wireless communication enabled devices. Thus, all devices of a federation may be enabled to exchange data among themselves, e.g., in order to exchange data values of parameters of their individual representational vectors or the exchange data with a wireless communication ground station for a long range communication.

According to an advantageous embodiment of the method, the representational vector may comprise at least one characteristic parameter selected one out of the group comprising: a device identifier, a federation identifier, a Service Set Identifier of a wireless local area network of a federated device, a Bluetooth name, a Rich Site Summary feed identifier of a federated device, a Media Access Control number of a federated device, a universal resource locator address of a resource accessed the device, a counter indicating how often a universal resource locator address has been accessed, an access token, a time of last access to a resource, global positioning data, and an epoch for a validity of the access token. Hence, any more or less permanent data value stored within the device may be an element of the representational vector. It may be clear that the more values may be available, the higher may be the security in identifying and authenticating a specific device. Some of the values may change over time but be more or less static, other values may be hardware related and thus, unchangeable.

According to one additionally preferred embodiment of the method, the authorization process for accessing the resource may also comprise authorizing an access to the resource by a resource manager based on the access token without performing the authentication process prior to each access to the resource. This may relieve the device from going through the authentication process every time a sensor measurement value may have to be sent from the device to a collecting service. Hence, a secure and only little performance requiring process may be used by the device for an authorization which may be required every time that sends or needs to send a measurement value to a service.

According to another advantageous embodiment of the method, the devices in the neighborhood update their representational vectors mutually. The devices may be enabled to perform updates of parts of their representational vector without any central control instance. This concept may be part of the federation concept. The devices are more or less self-organizing, at least in respect to a control of their identity. This neighborhood update may be instrumental in an authentication process for a new device to be added to the federation.

According to one permissive embodiment of the method, the forming the federation of the group of the devices may comprise adding at least one characteristic parameter value of a neighboring device to each representational vector of each device—or a subgroup thereof—in the federation. Thus, each device may have stored at least one value from a neighboring device. This way, the federation may be formed. The characteristic parameter used for this may, e.g., be an identifier for the federation.

According to a further preferred embodiment, the method may also comprise adding a new device to a federation by forcing a change of a characteristic parameter value—in particular, one which may be uncritical for an operation of the device—of a device already being part of the federation, and determining whether the forced changed characteristic parameter value may be propagated to and replicated by the new device to be added to the federation. Such a determination would be performed by an authentication server. This way, it may be ensured that the new device is within the wireless communication reach of the other devices of the federation. It may also be ensured that the new device is enabled to the same communication protocol and authentication protocol implemented by the other devices. The forcibly changed characteristic parameter value may be reset to its original value after a successful authentication process.

According to another embodiment, the method may also comprise adding a new device to the federation by forcing a change of a characteristic parameter value of the new device, and determining whether the forced changed parameter value is replicated to a predefined number of devices already being part of the federation. This may again be performed by an authentication server and may represent an alternative concept to the aforementioned embodiment.

In the following, a detailed description of the figures will be given. All instructions in the figures are schematic. Firstly, a block diagram of an embodiment of the inventive method for authentication and authorization of an access to a resource by a device is given. Afterwards, further embodiments as well as embodiments of the system for authentication and authorization of an access to a resource by a device will be described.

FIG. 1 shows a block diagram of an embodiment of the method 100 for authentication and authorization of an access to a resource—in particular a service, e.g., implemented as a cloud service by a device, in particular a SoC IoT device. The device is a system-on-a-chip resource weak device which may have limited computing power on board and which may not be suited for performing the complete authorization process for every resource access. The method comprises forming, 102, a federation of a group of the devices in a neighborhood, i.e., the devices are relatively close to each other. The devices are wireless communication enabled by means of a wireless communication technique based on, e.g., WiFi, Bluetooth, IR (infrared signals), GPRS (general packet radio service), UMTS (universal mobile telecommunications system), LTE (long-term evolution), or comparable short range on longer-range communication standards. The method 100 further comprises building, 104, a representational vector for each device of the federation of devices during an initial authentication procedure for the device. The representational vector comprises characteristic parameters of the device and neighboring devices. Furthermore, the method 100 comprises using, 106, an access token based authorization process for accessing the resource. It may be noted that the access token is generated during the initial authentication procedure, in which the representational vector of the device is used to confirm that a device that is new to the federation is in the neighborhood of already federated devices. If longer range communication methods are used by the devices a ground station in the neighborhood of the devices may not be required. Instead, a public base station may be used.

FIG. 2 shows a block diagram 200 of multiple devices 210, 212, 214, 216, 218, 220, 222, 224, 226, and 228 organized in three federations 230, 232, and 234. Each federation also comprises a ground station 204, 206, and 208 enabled for a communication to and from the devices of one of the federations 230, 232, and 234. Additionally, the devices are equipped with transceivers (not shown) for a wireless communication among each other and with the respective ground station. The devices here are basically shown as sensors but they may also be actuators. Moreover, the sensors may be of different type: measuring the temperature, measuring a pressure, measuring a distance, measuring humidity, measuring altitude, measuring speed, etc.

Each of the base stations 204, 206, and 208 is connected to an authentication server 202 instrumental for the process of adding—potentially as well for removing—a device to one of the federations 230, 232, and 234 of devices 210-228. The base stations 204, 206, and 208 may be connected by wire or wirelessly to the authorization service.

FIG. 3 shows a block diagram of an embodiment 300 of an implementation of the here proposed concept. As discussed in the context of FIG. 2, a device—e.g., device 210 as a representative for a new lead to be added device to the federation 230 shown in FIG. 2—may be connected to the authentication server 202. Actually, the connection may be achieved via the ground station 204. The authentication server 202 may work according to specific policies and governance rules 308 specified by the owner of the resource 306. It may, e.g., specify what kind of device—in particular make, type, measurement range, lifetime, environmental compliance, etc.—may be used as an input device or, in case of an actuator as an output device, by the resource 306. The resource 306 itself may be any service delivered by any computing device, e.g., any cloud service. The specific policies and governance rules 308 may change over time which may require that the device may be given a new access token. This may be handled by the authentication server 202.

Once the authentication of the newly to be added device 210 to the federation 230 may be confirmed in the way described above, the authentication server 202 may send an access token to the device 210. At the same time, the access token is sent by the authentication server 202 to a resource manager 304. As a consequence, a newly added device 210 may only send his access token together with a measurement value to the resource manager 304. The resource manager 304 may confirm—by means of the access token—that the received measurement value has come from an authenticated device 210 and may pass the received data (one or more values) to the resource 306. Additionally, the resource 306 or service may now communicate directly via the resource manager 304 with the device 210. No complicated authentication protocol may be required between the device 210 and the resource manager 304. Such a complex authentication process may only be required once during the initial setup of a new device as part of the authentication procedure.

FIG. 4 shows a block diagram 400 of an exemplary implementation of adding a new device 402 (shown in dashed line) to the federation 234 of devices 224, 226, and 228. The devices 224, 226, and 228 may be connected wirelessly via a related base station (not shown) to the authentication server 202. Also the new device 402 may be connected wirelessly (not shown) to the authentication server 202. Because the authentication server 202 has no information about the new device 402, it may receive the representational vector of the new device 402 and may force a change to one of the uncritical characteristic parameter values—e.g., its SSID—of the new device 402, i.e., to a characteristic parameter that is not essential for the operation of the device in the context of the federation 234. The new device 402 may detect such a forced change and react to it by broadcasting a challenging token 404 to one or more of the already existing devices 224, 226, and 228 wirelessly. The already existing devices 224, 226, and 228 may replicate or propagate the forced change into their representational vector. This may be detectable by the authentication server 202. If such a determination is made by the authentication server 202, the new device 402 may be confirmed as a new member to the federation 234 because the new device 402 has been identified by at least one of the other devices to 224, 226, and 228 of the federation. It is also confirmed that the new device 402 is in the neighborhood of the other devices 224, 226, and 228 because they are all in reach of the wireless signal of the devices. In order to match the propagated forced change of the uncritical characteristic parameter value by already federated devices, a counter token may be sent in parallel to the surrounding devices.

As an example for a representational vector for a device with a device ID 234 and a validity period or epoch as identified in the table, the following example may be considered:

TABLE 1

| | |
|---|---|
| device ID 234 | epoch 21221213 |
| federation ID | 123556 |
| SSID device 224 | 1001 |
| SSID device 226 | 1002 |
| SSID device 228 | 1003 |
| RSS1 device 1 | 56 |
| MAC device 224 | 01-23-45-67-89-ab |
| ... | |
| http://mycloudbox/temp-measure-service | n |
| http://mycloudbox/temp-set-service | n−1 |

Exemplary, a representational vector (table 1) has an ID of the federation, e.g., SSIDs for the three devices in question (224, 226, and 228), an RSS for device 1; also a MAC address (es) is shown as the exemplary representational vector. Many more characteristic parameters and respective values may be stored in the representational vector. Additionally, also HTTP addresses are shown as example. The values n, n−1 may represent the number of accesses to the services related to these HTTP addresses. At least one characteristic parameter value of another device of a federation should be stored by the other devices and vice versa.

FIG. 5 shows a flowchart 500 of a process if a device needs to access a resource. The process starts (step 502). A need to access a resource may be generated by a device (step 504). Firstly, it may be determined whether access may be granted to the resource by the device (step 506). The determination may be done by the resource manager 304 (FIG. 3). At step 506, in case of "yes", access to the resource may be given to the device (step 508). The representational vector may be updated if required (step 510) and the process may end (step 512). Such an update may relate to a sending time, a measurement value, a number of a measurement, etc.

At step 506, in case of "no" during the determination as to whether access will be granted to the device or not, it may next be determined whether the device belongs to a federation (step 514). At step 514, in case of "yes", the representational vector of the device may be updated (step 510) and the process may end (step 512).

At step 514, in case of "no" during the determination as to whether the device is federated, it may next be determined whether a federation exists (step 516). At step 516, in case of "no", a federation may be created (step 518). Then, again, the representational vector of the device may be updated (step 510) and the process may end (step 512). At step 516, in case of "yes", an access request may be generated and submitted for the resource owner (step 520). Such an access request may be processed by the authentication server 202 (FIG. 2). It may be determined whether conditions for form a federation have been met (step 522). At step 522, in case of "no", the representational vector may be updated if required (step 510) and the process may end (step 512). At step 522, in case of "yes", a request to create a federation may be initiated (step 524). Then, again, the representational vector may be updated if required (step 510) and the process may end (step 512).

FIG. 6 shows an embodiment of the system 600 for authentication and authorization of an access to a resource by a device 210. The device may be a system-on-a-chip resource weak device 210. However, the inventive concept may also be applied to systems not being weak computational-wise. The system comprises a federation 230 of a group of the devices 210, 212, and 214 in a joint neighborhood. The devices 210, 212, and 214 are wireless communication enabled. Each device 210, 212, and 214 of the federation 230 of devices 210, 212, and 214 comprises a storage (not shown) for a representational vector (compare table 1). The representational vector comprises characteristic parameters of the device 210 and neighboring devices 212 and 214. The system also comprises and a resource 306 to which access is grantable based on an access token (not shown) based authorization process by a resource manager 304. The access token is generated during the initial authentication procedure by the authentication server 202, in which the representational vector builds a basis for a confirmation that a device that is new to the federation is in the neighborhood of already federated devices 210, 212, and 214.

FIG. 7 shows a cloud computing environment 700 in which at least parts of the inventive concept may be deployed. A set of functional abstraction layers provided by a cloud computing environment is shown. It should be understood in advance that the components, layers, and functions shown in FIG. 7 are intended to be illustrative only, and embodiments of the invention are not limited thereto. As depicted, the following layers and corresponding functions are provided: hardware and software layer 702 include hardware and software components. Examples of hardware components include: mainframes 704, servers 706, RISC (Reduced Instruction Set Computer) architecture based servers 708, blade servers 710, storage devices 712, and networks and networking components 714. In some embodiments, software components include network application server software 716 and/or database software 718.

Virtualization layer 720 provides an abstraction layer from which the following examples of virtual entities may be provided: virtual servers 722, virtual storage 724, virtual networks 726 including virtual private networks, virtual applications and operating systems 728, and virtual clients 730. In one example, management layer 732 may provide the functions described below. Resource provisioning 734 provides dynamic procurement of computing resources and other resources that are utilized to perform tasks within the cloud computing environment. Metering and pricing 736 provide cost tracking as resources are utilized within the cloud computing environment and billing or invoicing for consumption of these resources. In one example, these resources may comprise application software licenses. Security provides identity verification for cloud consumers and tasks, as well as protection for data and other resources. User portal 738 provides access to the cloud computing environment for consumers and system administrators. Service level management 740 provides cloud computing resource allocation and management such that required service levels are met. Service Level Agreement (SLA) planning and fulfillment 742 provides pre-arrangement for, and procurement of, cloud computing resources for which a future requirement is anticipated in accordance with an SLA.

The workload layer 744 provide examples of functionality for which the cloud computing environment may be utilized. Examples of workloads and functions which may be provided from this layer include: mapping and navigation 746, software development and lifecycle management 748, virtual classroom education delivery 750, data analytics processing 752, and transaction processing 754. While not illustrated, the workload layer may also include an authentication server, a resource manager or, a resource, such as authentication server 202, resource manager 304, and resource 306 of FIG. 3.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system and is not intended to suggest any limitation as to the scope of use or functionality of embodiments of the invention described herein. Regardless, the computing system 800 is capable of being implemented and/or performing any of the functionality set forth hereinabove. In the computing system 800, there are components, which are operational with numerous other general purpose or special purpose computing system environments or configurations. Examples of well-known computing systems, environments, and/or configurations that may be suitable for use with the computing system 800 include, hut are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. The computing system 800 may be described in the general context of computer system-executable instructions, such as program modules, being executed by the computing system 800. Generally, program modules may include routines, programs, objects, components, logic, data structures, and so on that perform particular tasks or implement particular abstract data types. The computing system 800 may be practiced in distributed cloud computing environments where tasks are performed by remote processing devices that are linked through a communications network. In a distributed cloud computing environment, program modules may be located in both local and remote computer system storage media including memory storage devices.

As shown in the figure, the computing system 800 is shown in the form of a general-purpose computing device. The components of the computing system 800 may include, but are not limited to, one or more processors or processing units 802, a system memory 804, and a bus 806 that couples various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computing system 800 typically includes a variety of computer system readable media. Such media may be any available media that is accessible by the computing system 800, and it includes both, volatile and non-volatile media, removable and non-removable media.

The system memory 804 may include computer system readable media in the form of volatile memory, such as random access memory (RAM) 808 and/or cache memory 810. The computing system 800 may further include other removable/non-removable, volatile/non-volatile computer system storage media. By way of example only, storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

Program/utility 824, having a set (at least one) of program modules 816, may be stored in memory 804 by way of example, and not limitation, as well as an operating system, one or more application programs, other program modules, and program data. Each of the operating system, one or more application programs, other program modules, and program data or some combination thereof, may include an implementation of a networking environment. Program modules 816 generally carry out the functions and/or methodologies of embodiments of the invention as described herein.

The computing system 800 may also communicate with one or more external devices 818 such as a keyboard, a pointing device, a display 820, etc.; one or more devices that enable a user to interact with the computing system 800; and/or any devices (e.g., network card, modem, etc.) that enable the computing system 800 to communicate with one or more other computing devices. Such communication can occur via Input/Output (I/O) interfaces 814. Still yet, the computing system 800 may communicate with one or more networks such as a local area network (LAN), a general wide area network (WAN), and/or a public network (e.g., the Internet) via network adapter 822. As depicted, network adapter 822 may communicate with the other components of the computing system 800 via bus 806. It should be understood that although not shown, other hardware and/or software components could be used in conjunction with the computing system 800. Examples, include, but are not limited to: microcode, device drivers, redundant processing units, external disk drive arrays, RAID systems, tape drives, and data archival storage systems, etc.

Additionally, parts of the system for authentication and authorization of an access to a resource by a device may be attached to the bus system 806. This may, e.g., be the authentication server and/or the resource manager.

The descriptions of the various embodiments of the present invention have been presented for purposes of illustration, hut are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions Which execute on the computer, other programmable apparatus', or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a," "an," and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method, in a data processing system, comprising a processor and a memory, the memory comprising instructions that are executed by the processor to cause the processor to be configured to implement an authentication server for authentication and authorization of an access to a resource by a new device, wherein the new device is a system-on-a-chip resource weak device, the method comprising:

forming, by the authentication server, a federation of a group of devices in a neighborhood, wherein the group of devices in the federation are wireless communication enabled devices;

building, by the authentication server, a representational vector for each device of the federation during an initial authentication procedure for the device, wherein the representational vector comprises characteristic parameters of the device and neighboring devices;

responsive to a request to add the new device to the federation, forcing, by the authentication server, a change to a characteristic parameter value within a representational vector of the new device;

detecting, by the authentication server, that the forced change to the characteristic parameter value has been replicated by the new device to one or more other devices already in the federation into their respective representational vector; and responsive to detecting the change to the characteristic parameter value in the one or more other devices already in the federation, confirming, by the authentication server, the new device as a new member to the federation, wherein the new device uses an access token based authorization process for allowing access to the resource and wherein the access token is generated during an initial authentication procedure in which the representational vector of the new device is used to confirm that the new device is in the neighborhood of already federated devices.

2. The method according to claim 1, wherein the neighborhood is defined by a reach of a wireless communication mechanism of the wireless communication enabled devices.

3. The method according to claim 1, wherein the representational vector comprises at least one characteristic parameter selected from of the group comprising: a device identifier, a federation identifier, a Service Set Identifier of a wireless local area network of a federated device, a Bluetooth name, a Rich Site Summary feed identifier of a federated device, a Media Access Control number of a federated device, a universal resource locator address of a resource accessed the device, a counter indicating how often a universal resource locator address has been accessed, an access token, a time of last access to a resource, global positioning data, and an epoch for a validity of the access token.

4. The method according to claim 1, wherein the authorization process for accessing the resource further comprises:
authorizing, by the authentication server, an access to the resource by a resource manager based on the access token without performing the authentication process prior to each access to the resource.

5. The method according to claim 1, wherein the devices in the neighborhood update their representational vector mutually.

6. The method according to claim 1, wherein the f rx in of the federation further comprises:
adding, by the authentication server, at least one characteristic parameter value of a neighboring device to each representational vector of each device in the federation.

7. A system for authentication and authorization of an access to a resource by a new device, wherein the new device is a system-on-a-chip resource weak device, the system comprising:
a processor; and
a memory coupled to the processor, wherein the memory comprises instructions which, when executed by the processor, cause the processor to implement an authentication server for authentication and authorization of an access to a resource by a new device, wherein the new device is a system-on-a-chip resource weak device, and further cause the processor to:
form, by the authentication server, a federation of a group of devices in a neighborhood, wherein the group of devices in the federation are wireless communication enabled devices;
build, by the authentication server, a representational vector for each device of the federation during an initial authentication procedure for the device, wherein the representational vector comprises characteristic parameters of the device and neighboring devices;
responsive to a request to add the new device to the federation, force, by the authentication server, a change to a characteristic parameter value within a representational vector of the new device;
detect, by the authentication server, that the forced change to the characteristic parameter value has been replicated by the new device to one or more other devices already in the federation into their respective representational vector; and
responsive to detecting the change to the characteristic parameter value in the one or more other devices already in the federation, confirm, by the authentication server, the new device as a new member to the federation, wherein the new device uses an access token based authorization process for allowing access to the resource and wherein the access token is generated during an initial authentication procedure in which the representational vector of the new device is used to confim that the new device is in the neighborhood of already federated devices.

8. The system according to claim 7, wherein the neighborhood is defined by a reach of a wireless communication mechanism of the wireless communication enabled devices.

9. The system according to claim 7, wherein the representational vector comprises at least one characteristic parameter selected from of the group comprising: a device identifier, a federation identifier, a Service Set Identifier of a wireless local area network of a federated device, a Bluetooth name, a Rich Site Summary feed identifier of a federated device, a Media Access Control number of a federated device, a universal resource, locator address of a resource accessed the device, a counter indicating how often a universal resource locator address has been accessed, an access token, a time of last access to a resource, global positioning data, and an epoch for a validity of the access token.

10. The system according to claim 7, wherein the instructions further cause the processor to:
authorize, the authentication server, an access to the resource by a resource manager based on the access token, without performing the authentication process prior to each access to the resource.

11. The system according to claim 7, wherein the devices in the neighborhood update their representational vector mutually.

12. The system, according to claim 7, wherein the instructions to form the federation further cause the processor to:
add, by the authentication server, at least one characteristic parameter value of a neighboring device to each representational vector of each device in the federation.

13. A computer program product comprising a computer readable storage medium having a computer readable program stored therein for authentication and authorization of an access to a resource by a new device, wherein the new device is a system-on-a-chip resource weak device, wherein the computer readable program, when executed on a computing device, causes the computing device to implement an authentication server for authentication and authorization of an access to a resource by a new device, wherein the new device is a, system-on-a-chip resource weak device, and further causes the computing device to:
form, by the authentication server, a federation of a group of devices in a neighborhood, wherein the group of devices in the federation are wireless communication enabled devices;
build, by the authentication server, a representational vector for each device of the federation during an initial authentication procedure for the device, wherein the representational vector comprises characteristic parameters of the device and neighboring devices;
responsive to a request to add the new device to the federation, force, by the authentication server, a change to a characteristic parameter value within a representational vector of a first the new device;
detect, by the authentication server, that the forced change to the characteristic parameter value has been replicated by the new device to one or more, other devices already in the federation into their respective representational vector; and
responsive to detecting the change to the characteristic parameter value in the one or more other devices already in the federation, confirm, by the authentication server, the new device as a new member to the federation, wherein the new device uses an access token based authorization process for allowing access to the resource and wherein the access token is generated during an initial authentication procedure in which the representational vector of the new device is used to confirm that the new device is in the neighborhood of already federated devices.

14. The computer program product according to claim 13, wherein the computer readable program further causes the computing device to:

authorize, by the authentication server, an access to the resource by a resource manager based on the access token without performing the authentication process prior to each, access to the resource.

15. The computer program product according to claim 13, wherein the neighborhood is defined by a reach of a wireless communication mechanism of the wireless communication enabled devices.

16. The computer program product according to claim 13, wherein the representational vector comprises at least one characteristic parameter selected from of the group comprising: a device identifier, a federation identifier, a Service Set Identifier of a wireless local area network of a federated device, a Bluetooth name, a Rich Site Summary feed identifier of a federated device, a Media Access Control number of a federated device, a universal resource locator address of a resource accessed the device, a counter indicating how often a universal resource locator address has been accessed, an access token, a time of last access to a resource, global positioning data, and an epoch for a validity of the access token.

17. The computer program product according to claim 13, wherein the devices in the neighborhood update their representational vector mutually.

18. The computer program product according to claim 13, wherein the computer readable program further causes the computing device to:
    add, by the authentication server, at least one characteristic parameter value of a neighboring device to each representational vector of each device in the federation.

\* \* \* \* \*